UNITED STATES PATENT OFFICE.

RICHARD JUDSON DOYLE, OF OWEN SOUND, CANADA.

NON-INFLAMMABLE PAINT.

SPECIFICATION forming part of Letters Patent No. 490,547, dated January 24, 1893.

Application filed July 20, 1892. Serial No. 440,602. (No specimens.)

*To all whom it may concern:*

Be it known that I, RICHARD JUDSON DOYLE, a resident of Owen Sound, in the county of Grey and Province of Ontario, Canada, have invented certain new and useful Improvements in Non-Inflammable Paints; and I do hereby declare the following to be a full, clear, and exact description of the invention, such as will enable others skilled in the art to which it pertains to make and use the same.

The object of this invention is to produce a non-inflammable oil or paint, and it consists, essentially, in a mixture of vinegar, lime water, salt, alum, white vitriol, linseed or other drying oil and crude petroleum compounded in the proportions and in the manner hereinafter more fully described.

In order to produce my fire proof oil or paint, I proceed as follows: First mix vinegar and lime water in equal parts, and in order that these two elements may be thoroughly combined keep the solution in a warm place for three days or longer and stir it frequently. Then add to one gallon of this said mixture one half pound of salt, one quarter pound of alum and one quarter pound of white vitriol, each in the form of a powder. The mixture of vinegar and lime water with the said three other ingredients is then heated to its boiling point and is continuously stirred during the heating to dissolve the salt, alum and white vitriol. To one gallon of this mixture one gallon of linseed or other drying oil is added and the mixture heated to its boiling point and continuously stirred. When this compound is at its boiling point one gallon of crude petroleum is added and the mixture again heated to its boiling point. This compound forms a non-inflammable oil which may be mixed with any kind of coloring pigments, but if a light color is desired petroleum is omitted.

What I claim and desire to secure by Letters-Patent is:

1. The hereinbefore described composition forming a non-inflammable oil or paint, consisting of vinegar, lime water, salt, alum, white vitriol, and linseed or other drying oil, compounded substantially in the proportions and in the manner hereinbefore described.

2. The hereinbefore described composition forming a non-inflammable oil or paint, consisting of vinegar, lime water, salt, alum, white vitriol, linseed or other drying oil and petroleum, compounded substantially in the proportions and in the manner hereinbefore set forth.

In testimony whereof I have signed this specification in the presence of two subscribing witnesses.

RICHARD JUDSON DOYLE.

Witnesses:
 S. J. HOPKINS,
 MAGGIE COBEAU.